United States Patent [19]

Grodde et al.

[11] 4,282,930

[45] Aug. 11, 1981

[54] PROCESS FOR THE RECOVERY OF PETROLEUM FROM SUBTERRANEAN FORMATIONS

[75] Inventors: Karl-Heinz Grodde; Hartwig Volz, both of Celle, Fed. Rep. of Germany

[73] Assignee: Deutsche Texaco Aktiengesellschaft, Hamburg, Fed. Rep. of Germany

[21] Appl. No.: 19,537

[22] Filed: Mar. 12, 1979

[30] Foreign Application Priority Data

Mar. 17, 1978 [DE] Fed. Rep. of Germany ....... 2811666

[51] Int. Cl.$^3$ .............................................. E21B 43/22
[52] U.S. Cl. .................................. 166/305 R; 166/274
[58] Field of Search ................... 166/273, 274, 305 R

[56] References Cited

U.S. PATENT DOCUMENTS

| 3,707,187 | 12/1972 | Knight et al. | 166/273 X |
| 3,724,545 | 4/1973 | Knight | 166/273 |
| 3,783,944 | 1/1974 | Jennings et al. | 166/274 |
| 3,827,496 | 8/1974 | Schroeder | 166/273 |
| 3,844,350 | 10/1974 | Knight et al. | 166/273 |
| 3,850,244 | 11/1974 | Rhudy et al. | 166/273 |
| 3,915,230 | 10/1975 | Flournoy et al. | 166/273 X |
| 3,946,811 | 3/1976 | Norton et al. | 166/274 |
| 4,011,910 | 3/1977 | Rhudy et al. | 166/274 |
| 4,195,689 | 4/1980 | Chang | 166/246 |

*Primary Examiner*—James A. Leppink
*Assistant Examiner*—George A. Suchfield
*Attorney, Agent, or Firm*—Carl G. Ries; Robert A. Kulason; Charles L. Bauer

[57] ABSTRACT

An improved polymer flood process for the recovery of petroleum from a subterranean formation wherein a slug of a fresh water aqueous solution of a salt-insensitive polymer is injected into the formation prior to the undertaking of the polymer flood using a fresh water solution containing a partially hydrolyzed polyacrylamide.

4 Claims, No Drawings

PROCESS FOR THE RECOVERY OF PETROLEUM FROM SUBTERRANEAN FORMATIONS

DESCRIPTION OF THE PRIOR ART

Among the more widely practiced methods for the recovery of petroleum from a subterranean formation is water-flooding. In this method, flood water is injected into the formation via one or more injection wells, which water displaces the petroleum in the formation toward one or more production wells. More recently, improvements in water-flooding methods have included the use of water-soluble polymers whereby the viscosity of the flood water is increased. The "thickened" water results in a more favorable mobility ratio and leads to improved oil recovery. There are only a few polymers which are suitable for the purpose and can be used economically. At small concentrations these polymers are effective in increasing the viscosity of the water in the desired manner and are also resistant to the conditions of the formation. Among the suitable polymers are the polyacrylamides, which may be partially hydrolyzed, the polysaccharides and the cellulose ethers, such as hydroxyethylcellulose. The polyacrylamides are long-chain polymers of acrylamide with the general formula $$[-CH_2-CH(CONH_2)-]_n$$

wherein n is about 50,000 or over. The molecular weight is three to six million. With partially hydrolyzed polyacrylamides, some of the amide groups—$CONH_2$—are converted by saponification reaction into carboxylate groups—$COO^-$—. Particularly favorable for polymer flooding are the partially hydrolyzed polyacrylamides, that are hydrolyzed to 10–60%, preferably in the 20–35% range. Partially hydrolyzed polyacrylamides of high molecular weight (1 to 10 million) are relatively inexpensive. The desired viscosity increase for small concentrations, of about 0.3–1 g/l, however is achievable only in solutions in practically salt-free or fresh water. Solutions of 0.5 g/l of partially hydrolyzed polyacrylamides in soft water at shear gradients between 1 and 10 $s^{-1}$, which are representative for flowing in deposits, have a viscosity that is 10 to 40 times higher than that of water. In order to achieve this viscosity increase in salt water there are required, on the other hand, concentrations of from 1.5 to 4 g/l of the same polymer, with the risk of the polymer being precipitated in the form of water-insoluble salts, when the portion of bivalent ions in the total salinity is high. The precipitation of polyacrylamide can be eliminated and a reduction of the salt-sensitivity can thus be achieved by decreasing the degree of hydrolysis to below 15%, in extreme cases to a hydrolysis rate of 0, in the case of non-ion products. However, concentrations of from 1.5 to 4 g/l are still required to increase the viscosity in salt water.

Polysaccharides are linearly condensed saccharides with up to several thousand monosaccharide units, which are produced for the present use by means of *Xanthomonas campestris* or *Fungus Sclerocium*. The molecular weight suitable for polymer flooding is in the range of 500,000 to several million, preferably 1 million and over. Polysaccharides of high molecular weight are less salt-sensitive, but more expensive than polyacrylamides and less viscosity-productive. Concentrations of about 0.75 g/l are required in order to achieve a 10 to 20 fold increase in viscosity. Per cubic meter of polymer solution, about three times the expenditure is to be incurred than for partially hydrolyzed polyacrylamides in soft water.

Water-soluble cellulose ethers, in particular hydroxyalkylcellulose with low alkyl groups, such as $C_{1-4}$, in particular hydroxy ethyl cellulose, are also suitable for polymer flooding wherein the molecular weight is 300,000 to 600,000 and over. Hydroxyethylcellulose is also little salt-sensitive, however, as other cellulose derivatives also, it can be made only with limited molecular weight, less than 500,000. Therefore, for the desired increase in viscosity, concentrations of about 3 g/l are necessary.

Most petroleum formations contain highly-saline waters, which contain, in addition to the alkali chlorides, considerable concentrations of alkaline salts and even small concentrations of borates, sulphides and iron ions that are particularly injurious to all polymers. It is not possible to dissolve one of the named polymers in such waters without obtaining a decomposition or flocculation of the polymer—in many cases only after some time and/or at an increased temperature. It is also known, and in fact especially when using surfactants to increase the oil yield, to optimize the conditions in the formation by means of a preflood operation by the injection of water of suitable salinity for the chemicals solution to be used. It is also known to preflood with soft water or water of a low saline content in order to be able to use the relatively inexpensive aqueous solution of partially hydrolyzed polyacrylamide. In tests on sand packs it has been shown that with homogeneous packing and linear flow some 25% of the pore volume passed through is necessary to reduce the salinity of water to 1% of the original value, as a result of which the damaging of the polyacrylamide would be reduced to a tolerable extent. In formation models with radial flow and nonhomogenous flowing capacity considerably greater volumes are required for preliminary flooding. For use in the field this means that it would be necessary for some years to effect a preliminary flooding with soft water, and thus the start of the polymer flooding and thereby the additional oil recovery would be delayed.

In a formation having a highly saline aqueous saturation it is also possible to inject salt-insensitive polymers, such as polysaccharide, non-hydrolyzed polyacrylamide or polyacrylamide, hydrolyzed to maximum 15%, or hydroxyethylcellulose. On mixing with salt water of the formation, viscosity reduces simply correspondingly to dilution, differently from when partially hydrolyzed polyacrylamides are used. These polymers suffer, if at all, only limited damage of viscosity by salt-water. Because of the high cost however, the use of polymers for the entire flooding project, mostly volumes of 20 to 40% of the pore volume to be covered, is not a very economical proposition.

It is thus an object of the present invention to overcome the problems associated with polymer flooding by the use of a first slug of a salt-insensitive polymer prior to undertaking a polymer flood with a partially hydrolyzed polyacrylamide.

FIELD OF THE INVENTION

This invention relates to a process for recovering petroleum from underground formations by polymer flooding wherein a slug of an aqueous solution of a salt-insensitive polymer is injected prior to undertaking the polymer flood.

DESCRIPTION OF THE PREFERRED EMBODIMENT

It has now been found that it is possible to replace the preliminary flooding with soft water by a very small volume of these salt-insensitive polymers in soft water, in order to protect a subsequently flooded solution of partially hydrolyzed polyacrylamide in soft water from damage by the formation water.

In surprising manner the salt content at the front of the salt-insensitive polymer solution is reduced so quickly to minimum values that only a small percentage of the pore volume of salt-insensitive polymer solution is required to obtain the same reduction of salt content as with large volumes of soft water. Besides the polysaccharide solution this effect can be obtained with solutions of other salt-insensitive polymers in soft water such as with hydroxyalkyl ethers of cellulose, particularly with hydroxyethylcellulose or nonhydrolyzed polyacrylamide, or polyacrylamide hydrolyzed to maximum 15%.

The volume of the injected slug of the aqueous solution of the salt-insensitive polymer should be in the range of 5 to 15%, preferably 7 to 10%, of the pore volume of the formation to be flooded. Advantageously, the subsequent polymer flooding is carried out with a volume corresponding to 10 to 40% of the formation pore volume with a partially hydrolyzed polyacrylamide.

Solutions of such high molecular materials are not genuine liquids in the rheological sense. The viscosity depends on the velocity gradient. The flow characteristics of this pseudo plastic solution follows the exponential law:

$$\gamma^\eta = \tau/\eta_1 \quad (1)$$

$\gamma$ = shear rate (s$^{-1}$)
$\tau$ = shear strength (dyne/cm$^2$)

$\eta$ and $\eta_1$ are constants, $\eta_1$ is the apparent viscosity at a shear rate of 1 s$^{-1}$. The exponent, n, is smaller than 1. For genuine liquids n=1. The concentration of the polymer solution is to be adjusted in such a way that its apparent viscosity under deposit conditions reaches a high multiple of the viscosity of the water, preferably 5 to 30 times.

The improvement in polymer flooding was demonstrated in the following laboratory tests. A plexiglass model, geometrically similar to a formation deposit, was filled with sand, and impregnated with oil and salt water in a manner corresponding to the fluid ratios prevailing in formation.

In the first test, the model was waterflooded, with soft water in the known manner of the art, using an amount of about 37% of the pore volume. The waterflood was followed by the injection of an aqueous solution of soft water containing 0.5 kg/m$^3$ of partially hydrolyzed polyacrylamide. After an amount of about 20% of the pore volume had been injected, the concentration of the polyacrylamide was linearly reduced from 5 kg/m$^3$ to 0 kg/m$^3$ during continued injection of an additional 20% pore volume. The average molecular weight of the partially hydrolyzed polyacrylamide was about 4 million.

In the second test, first of all, without a preliminary waterflooding with soft water, a slug of 7% of the pore volume of a solution of 0.75/m$^3$ kg polysaccharide having an average molecular weight of about 12 million, was injected, followed by a slug of 15% of the pore volume of 0.5 kg/m$^3$ of the partially hydrolyzed polyacrylamide. Thereafter, a slug of 20% pore volume containing the partially hydrolyzed polyacrylamide in a linearly decreasing concentration as described above, was injected.

Although the amount of polymer used and the costs were in the second instance higher than in the first, an economic advantage, calculated on a high level in terms of field conditions, was obtained. It was 50% higher than with the comparative process in the first test. This substantial and surprising advance obtained according to the invention is conditioned by savings in waterflooding costs and also substantially through the oil yield coming about 30 months earlier.

I claim:

1. In a process for the recovery of petroleum from underground formations by means of a polymer flood employing a salt-sensitive partially hydrolyzed polyacrylamide in soft water, the improvement comprising the injection of a slug of a solution of a salt-insensitive polymer in soft water, immediately prior to the undertaking of said polymer flood, said salt-insensitive polymer being selected from the group consisting of a polysaccharide, a polyacrylamide hydrolyzed from 0% to 15%, and a cellulose ether.

2. Process according to claim 1 wherein said cellulose ether is a hydroxyethylcellulose.

3. Process according to claim 1 wherein said aqueous slug of salt-insensitive polymer is injected in amounts of 5 to 15% pore volume.

4. A process for the recovery of petroleum from underground formations by means of a polymer flood comprising the steps of injecting a slug of a soft water solution of a salt-insensitive polyacrylamide polymer hydrolyzed from 0% to 15% and thereafter injecting a salt-sensitive partially hydrolyzed polyacrylamide solution in amounts of 10% to 40% pore volume.

* * * * *

UNITED STATES PATENT AND TRADEMARK OFFICE
CERTIFICATE OF CORRECTION

PATENT NO. : 4282930
DATED : August 11, 1981
INVENTOR(S) : Karl-Heinz Grodde; Hartwig Volz It is certified that error appears in the above—identified patent and that said Letters Patent is hereby corrected as shown below:

Column 1, line 55:

For "extreme cases to a hydrolysis rate of 0, in the case of" read "extreme cases to a degree of hydrolysis of 0, in the case of"

Column 3, equation (1) and line 43:

exponent "$\eta$" should be --n--

IN THE CLAIMS: Add Claim 5

5. Process according to Claim 1 wherein the concentration of said salt-insensitive polymer is adjusted so that the apparent viscosity under flooding conditions achieves a high multiple of the viscosity of the water preferably 5 to 30 times.

On the cover sheet "4 claims" should read --5 claims --.

Signed and Sealed this

Third Day of November 1981

[SEAL]

Attest:

GERALD J. MOSSINGHOFF

Attesting Officer    Commissioner of Patents and Trademarks